United States Patent [19]

Lampard

[11] 4,248,192
[45] Feb. 3, 1981

[54] INTERNAL COMBUSTION ENGINE AND METHOD OF OPERATION THEREOF WITH ISOLATED COMBUSTION INITIATION

[76] Inventor: Robert D. Lampard, 30 Kings Park Rd., West Perth, Australia

[21] Appl. No.: 903,243

[22] Filed: May 5, 1978

[30] Foreign Application Priority Data

| May 5, 1977 | [AU] | Australia | PC9992 |
| May 5, 1977 | [AU] | Australia | PC9993 |
| May 16, 1977 | [AU] | Australia | PD0101 |
| Nov. 22, 1977 | [AU] | Australia | PD2504 |

[51] Int. Cl.³ .......................... F02B 19/02
[52] U.S. Cl. ................. 123/256; 123/262; 123/275; 123/292
[58] Field of Search .......... 123/32 C, 32 D, 33 D, 123/33 VC, 32 ST, 32 SP, 30 D, 191 S, 191 SP, 143 R, 32 F, 32 G

[56] References Cited

U.S. PATENT DOCUMENTS

| 892,296 | 6/1908 | Oberhänsli | 123/33 D |
| 1,204,986 | 11/1916 | Irwin | 123/33 VC |
| 1,406,877 | 2/1922 | Lemaire | 123/32 F |
| 1,653,825 | 12/1927 | Saives | 123/33 D |
| 1,892,040 | 12/1932 | de Malvinde Montazet et al. | 123/33 D |
| 2,197,901 | 4/1940 | Smith | 123/191 SP |
| 2,204,068 | 6/1940 | Chapman | 123/32 C |

FOREIGN PATENT DOCUMENTS

| 111446 | 9/1940 | Australia | 123/32 SP |
| 2528941 | 1/1977 | Fed. Rep. of Germany | 123/32 C |
| 2278920 | 2/1976 | France | 123/33 VC |

*Primary Examiner*—Charles J. Myhre
*Assistant Examiner*—Andrew M. Dolinar
*Attorney, Agent, or Firm*—Fleit & Jacobson

[57] ABSTRACT

Internal combustion engine wherein a main air fuel charge is ignited by first igniting a pilot air fuel charge and bringing the two charges together, the main charge being compressed before ignition to a higher compression ratio than the pilot charge.

14 Claims, 2 Drawing Figures ature, and the combined effect is to raise the mean pressure during the combustion process and correspondingly increase the energy required to achieve the compression while at the same time requiring a more robust engine structure.

INTERNAL COMBUSTION ENGINE AND METHOD OF OPERATION THEREOF WITH ISOLATED COMBUSTION INITIATION

BACKGROUND OF THE INVENTION i. Field of the Invention

This invention relates to internal combustion engines and methods of operation thereof.

ii. Prior Art

In recent years, present internal combustion engines have been subjected to increasing demands to satisfy environmental and economic considerations of our modern society. While some improvements have been made, the combined objectives of improved fuel consumption and low emissions have formed a complex problem, since the many factors involved are largely conflicting, and generally the methods used to reduce emissions tend to increase engine fuel consumption which, in the light of the urgent need to conserve and wisely use our energy resources, is totally unacceptable.

Any form of liquid or gas fuel will for a given weight when completely burnt, release a fixed amount of heat. Present, well-developed engines possess combustion efficiencies which leave little scope for improvement in indicated thermal efficiency. However, substantial improvements can be obtained by ensuring that the fuel's heat energy is released early in the expansion, with suitable consideration of the mechanical aspects of conversion, and then taken through a large expansion ratio, at all times regardless of engine load, so that the bulk of the expansive energy can be converted to usable rotary torque. This process must also be achieved using lean fuel to air ratios as not only does thermal efficiency rise as the fuel's ratio is reduced, due to the lower flame temperature reducing direct heat loss, but it also stimulates complete burning; this lean operation also being vital to achieve a reduction in undesirable exhaust emissions.

In conventional petrol engines operating on the common Otto cycle these previous requirements can not be met. This is because such engines depend upon combustion, under all load conditions, of an air fuel ratio that can be readily ignited by the use of a spark plug. As air fuel mixtures can only be ignited by a spark if the ratio of air to fuel is close to that of a chemically correct mixture, means must be provided to ensure that, regardless of engine load, this mixture ratio is maintained. To achieve this, both the volume of air and fuel must be regulated in accordance with the desired engine load by the use of throttling.

When the amount of air taken in by the engine's displacement is restricted a number of undesirable effects arise. Firstly, under part load, which is how an automotive engine spends most of its time, the engine is unable to use an efficient expansion ratio due to the effects of throttling. The cost of this is significant, as the brake thermal efficiency rises dramatically through the compression ratio's range in spark ignited engine. Secondly, the engine is subjected to an additional negative load, as when throttled for light load it in effect works as a vacuum pump. Thirdly, the fuel and air mixture, being constantly close to stoichiometric proportions, always burns at almost the maximum obtainable temperature so it can not obtain the reduced direct heat loss benefits of a lower cycle temperature. Its direct heat losses are therefore correspondingly high while specific heat effects and disassociation of the combustion products further reduces efficiency. This common spark ignition method of operation, having at the best of times only just sufficient air to consume the fuel, results in the combustion being undesirably slowed down while it is seldom complete, with a portion of the fuel's carbon content being expelled as carbon monoxide.

If the diesel engine and the methods it uses are considered, it can be readily appreciated why the thermal efficiency of such an engine is higher than a petrol engine and why the overall specific fuel consumption of a diesel engine, when used in identical automotive application to a petrol engine, is almost 50% less. The diesel gains this significant improvement mainly by avoiding the need for throttling. Its load is controlled solely by reducing or increasing the fuel consumed. This fuel is burnt rapidly, and under light loads completely and at all times the heat so produced is expanded through a large and efficient expansion ratio. It can also take full advantage of a lower cycle temperature, and its efficiency drops little as the engine's load is reduced while the exhaust products normally contain little, if any, carbon monoxide.

Due to these factors the diesel engine exhibits more potential to meet current demands for reduced emissions and fuel consumption than any other present form of engine. However, these advantages are to a large extent sacrificed when a diesel engine is designed to fill the exacting requirements of automotive use and has to conform to the performance standards set by the petrol engine, which we are used to and expect in a vehicle.

The main disadvantage of the diesel engine is the high working pressures involved to make the cycle practical. It is subjected to pressure loading which can not be utilized without great attention to the strength, tolerances and materials used in its construction and, generally for a given power output, will cost twice as much to manufacture as a petrol engine. Even with the finest selection of alloys the engine components also weigh more and require greater bearing areas. Consequently, if automotive engine speeds are approached, the additional friction and dynamic forces increase the mechanical losses dramatically so that much of its potential fuel savings are lost, as high speed low load engine operation is the norm for automotive use.

The high peak pressures generated in a diesel engine also create shock waves that are transmitted through the engine castings, producing objectionable noise and torsional vibrations that are difficult to control, so the power flow is not as smooth as an equivalent petrol engine. In order to approach petrol engine speeds, a diesel engine must utilize some form of turbulent swirl chamber to increase the air speed to a level that will enable complete mixing and combustion of the fuel in the short time available. While this works well, and comparatively high engine speeds can be obtained, its use further degrades the diesel's potential fuel consumption; the agitation of the air takes place during the compression process and this compression must result in attainment of a high enough temperature to readily ignite the injected fuel. As the air is forced into the swirl chamber it gives up much of its compression heat, so to compensate for this loss a very high ratio of compression must be used. This action correspondingly increases the cycle pressure further; also this higher level of compression increases the density of the working fluid during combustion, as density of gas is a major factor in heat exchange; direct heat loss presents a problem.

Being forced to use such high compression to ensure combustion is, unfortunately, not accompanied by such a corresponding increase in efficiency as one would expect. As compression levels are increased a point is reached at which further increase is not worthwhile from a practical standpoint. Efficiency gains are very worthwhile up to about 12:1. After that they are dramatically and progressively smaller and with normal engine methods, impractical to obtain. The high speed automotive diesel is forced to use a very high level of compression solely to provide ignition heat, its level needing to be almost double that of the practical ideal of about 12:1.

The object of this invention is to demonstrate how the performance of any suitable engine, with these comparatively minor changes in construction and combustion methods, can be manipulated to produce the beneficial engine characteristics of a diesel engine without resorting to impractical compression levels to obtain ignition, and the corresponding high cycle pressures which form an unavoidable aspect of normal true diesel practice. With this method there can be provided, by split phased combustion, an approach which avoids the undesirable aspects of the diesel and the Otto cycle while fully utilizing the beneficial features of each cycle.

BRIEF SUMMARY OF THE INVENTION

According to the present invention there is provided a method of operating an internal combustion engine wherein a main air fuel charge is ignited by first igniting a pilot air fuel charge and bringing the two charges together, characterized in that the main charge is compressed before ignition to a higher compression ratio than the pilot charge. When spark ignition is used the pilot charge may be compressed to a compression ratio less than that at which spontaneous combustion will occur. The main charge may be compressed to a compression ratio, prior to ignition, which ensures a high expansion efficiency. Generally, a compression ratio in the range of 12:1 to 15:1 is employed for the main charge and of the order of 6:1 to 8:1 in the pilot charge.

The invention also provides an internal combustion engine comprising means for forming a compressed main air fuel charge and a pilot compressed air fuel charge, means for igniting the pilot charge, valve means operable to bring the two charges together after said igniting to cause the main fuel charge to be ignited, and means for expanding the ignited main charge to generate work, characterized in that the said compression means operates to compress the pilot charge to a lesser compression ratio than the main charge.

In a particularly preferred embodiment, the invention provides an internal combustion engine comprising a cylinder with a piston reciprocable therein to cause cyclic variation in the volume of a main combustion chamber associated with the cylinder, inlet means for admitting working fluid into the said main combustion chamber, for compression by decrease in said volume, a subsidiary combustion chamber and valve means operable to control communication between the main and subsidiary combustion chambers and means for igniting working fluid in the subsidiary combustion chamber; the inlet means operating to admit at least an air component of the working fluid to the main combustion chamber for compression thereof as said piston advances in said cylinder and said valve means allowing communication between the combustion chambers so that part at least of said air component of said working fluid is initially directed into the subsidiary combustion chamber for compression also, said valve means blocking communication between the two chambers before the ultimate compression ratio in the main chamber is reached and opening communication between the chambers after combustion in the subsidiary chamber has taken place to ignite the working fluid in the main combustion chamber for subsequent expansion and driving of said piston. Fuel components of the working fluid may be admitted to the combustion chambers by fuel injectors. The main combustion chamber may comprise a chamber in the cylinder head of the engine communicating via a passage with the cylinder interior. The cylinder interior may form a third combustion chamber in continuous communication with the main combustion chamber. The said subsidiary combustion chamber may communicate with the main combustion chamber via a passageway and the valve means may include a valve in the passageway to control the said communication between the combustion chambers. The said valve may be operated by a cam shaft which may comprise the same cam shaft as operates inlet and exhaust valves to the main combustion chamber. The engine may be either a two-stroke or 4-stroke engine.

BRIEF DESCRIPTION OF THE DRAWINGS

The invention is further described with reference to the accompanying drawings in which.

DETAILED DESCRIPTION

Figure 1:
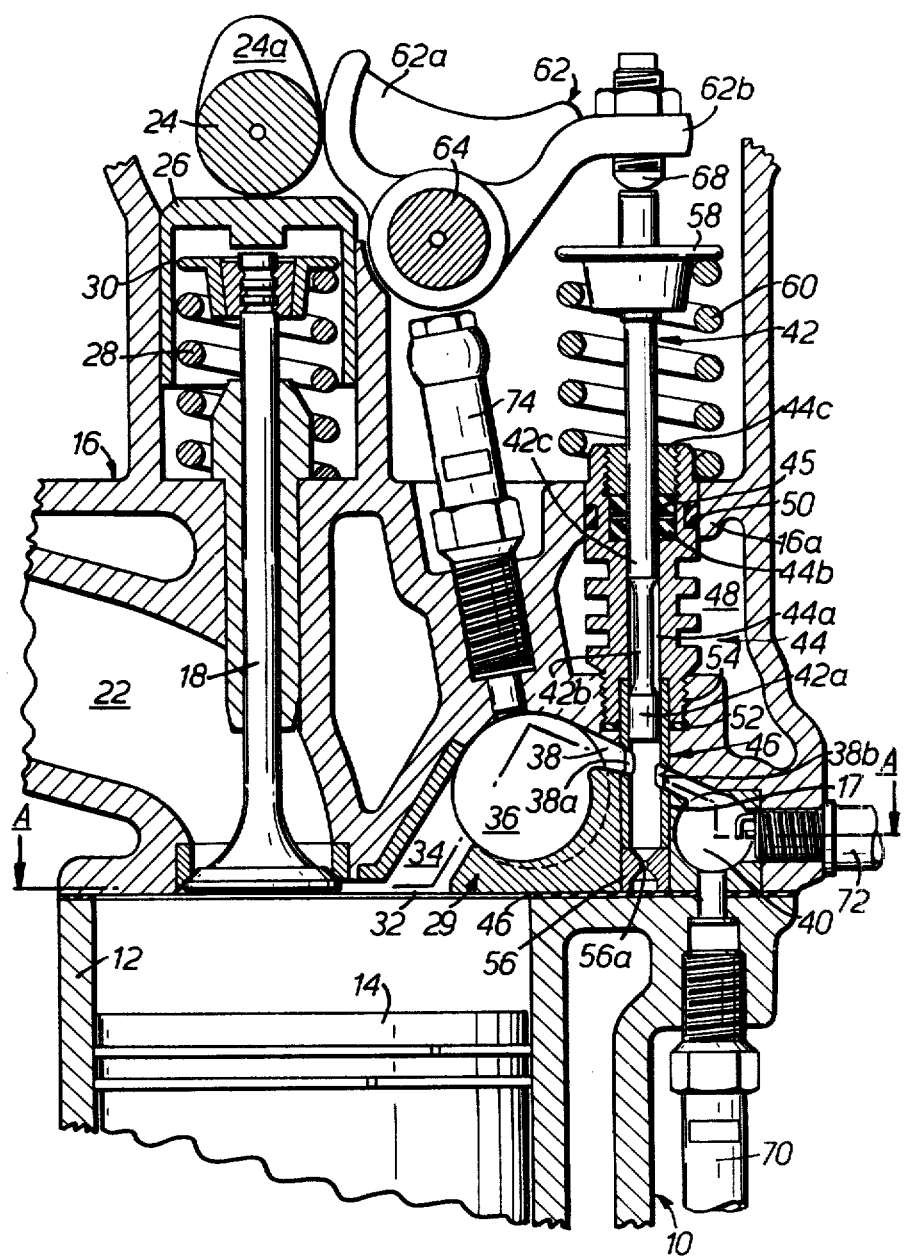
FIG. 1 is an axial cross-section of one cylinder of an internal combustion engine constructed in accordance with the invention.

The engine shown is a modification of a standard internal combustion engine. It includes a generally conventional cylinder block 10, with a number of identical cylinders, only one of which, together with its reciprocating piston 14, is shown, denoted by reference numeral 12. Piston 14 is substantially flat topped. The stroke of the engine is arranged to be such that only a small clearance exists at top dead centre between the piston and the lower surface of the cylinder head 16 of the engine.

The cylinder head 16 has the usual valve gear including inlet and exhaust valves 18, 20 to control inlet and exhaust to the engine via inlet and exhaust passages, 22, 23.

The valves 18, 20 are operated from an overhead cam shaft 24, the cam shaft having lobes which operate against caps 26 over the upper ends of the valves, the valves being spring biased to closed condition by springs 28 between the head 16 and collets 30 on the upper ends of the valves.

The timing of the operation of the valves 18, 20 is conventional for a 4-stroke engine.

Figure 2:
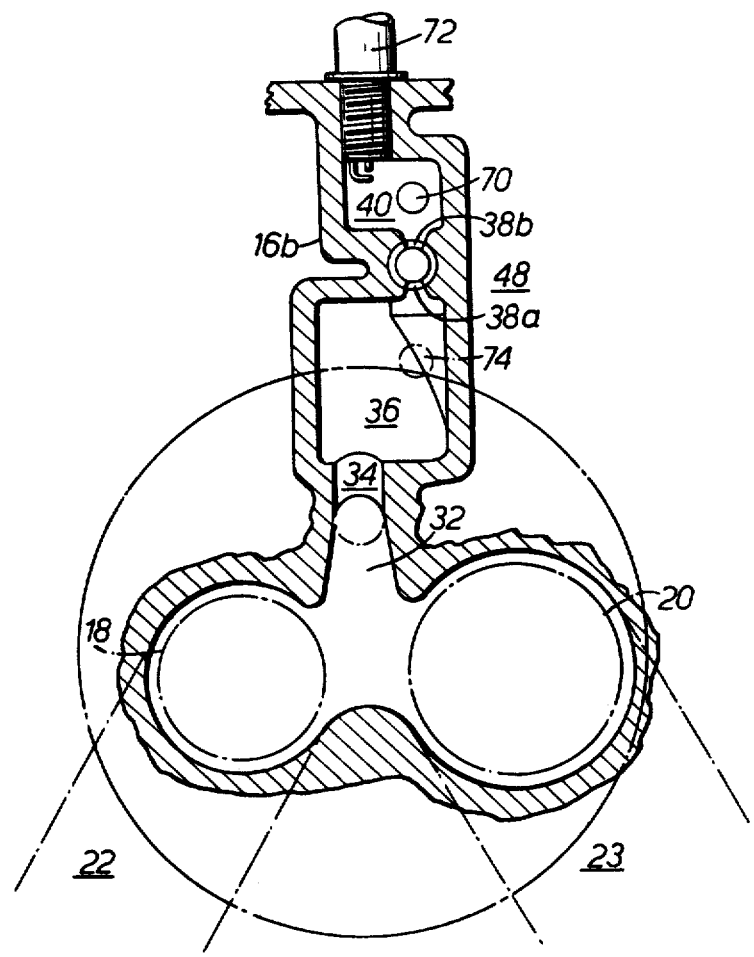
FIG. 2 is a cross-section on the line A—A of FIG. 1.

The surface of head 16 which closes cylinder 12 is substantially flat except for a slightly recessed portion 32 (FIG. 2). This portion has three lobes, one extending around the exhaust valve opening, one around the inlet valve opening and the third leading to an inclined passageway 34 in the head 16. Passageway 34 leads to a main or swirl chamber 36 in head 16. Chamber 36 is generally cylindrical with its axis transverse to the axial direction of cylinder 12 but the peripheral surface has a slightly helical shaping.

A further passageway 38 extends downwardly from chamber 36, within head 16, and leads to further subsidiary chamber 40 within the head. Chamber 40 is also of generally cylindrical form with its axis transverse to the axis of cylinder 12.

Communication between chambers 36 and 40 along passageway 38 is controlled by a reciprocating valve 42. This has its axis parallel to the direction of extent of cylinder 12 and its lower end portion 42a is received in a cylindrical valve sleeve 46 received in a bore 17 in the under surface of head 16. Sleeve 46 is positioned to extend across passageway 38 and has opposed side openings 38a, 38b which provide communication between the passageway and the interior of the valve sleeve. At its upper end, the valve sleeve is held within the head 16 by a finned cylindrical valve housing 44 which is threaded at its lower end into a bore 54 in the head 16 (coaxial with bore 17) to bear upon the upper end of the valve sleeve to hold it in position. A crushable teflon sealing ring 52 is positioned between the lower transverse surfaces of the housing 44 and the threaded bore 54 into which housing 44 extends.

In order to accurately position the sleeve with the openings 38a, 38b aligned with passageway 38, a spacer 56 is positioned in bore 17 between the upper surface of the cylinder block 10 and the lower transverse face of the sleeve 46. Then, when housing 44 is screwed down, in bore 17, the sleeve 46 is firmly held and aligned between the spacer 56 and the housing 44. The housing 44 thence extends upwardly through a liquid cooling cavity 48 in head 16 and through an upper wall part, 16a of the head bounding the cavity 48. The upper end of the housing 44 is sealed, where it passes through the upper wall part 16a, by an O-ring 50.

From the lower end portion 42a of the valve 42, the valve extends upwardly in sleeve 46, through an internal bore 44a in housing 44, through a sealing pack 44b, through an insert 44c, to project from the head 16. Insert 44c is in the form of a threaded annular member which is threadedly received in an enlarged bore 45 in the upper end of housing 44, the pack 44b being in the lower end of the bore and being held in position by the insert 44c. At its upper end, the valve 42 is provided with a conventional collet 58 presenting an outwardly projecting flange, and a helical valve spring 60 is positioned between this flange and the wall part 16a to normally bias the valve upwardly so that the lower part 42a is positioned above the openings 38a, 38b to maintain passageway 38 open.

Valve 42 is operated via a rocker arm 62 which is mounted for pivotal movement on a shaft 64 extending parallel to shaft 24. The rocker arm 62 has a first portion 62a which bears against a cam lobe 24a on cam shaft 24 and a second portion 62b which has a downwardly extending tappet 68 threaded into a threaded opening in portion 62b and positioned to bear against the upper end of valve 42.

The lower end 42a of the valve 42 is a neat sliding fit in sleeve 46 and the upper part 42c is a neat sliding fit in housing 44. Between parts 42a, 42c is a narrowed portion 42b which is of much less cross section than the sleeve bore. The movement of the valve 42 is such that it moves between an upper extreme shown on the drawing and a lower extreme (not shown). At the upper extreme, the portion 42a is above openings 38a, 38b so that passageway 38 is open. At the lower extreme the portion 42a is below the openings 38a, 38b so that the passageway is also open, gas being able to pass between the openings 38a, 38b around valve portion 42b. At a location between its two extremes the portion 42a blocks openings 38a, 38b and passageway 38. This blocking occurs twice during each revolution of cam shaft 24 and thus twice during each cycle of operation. As described later, only one such blocking is significant to basic operation of the engine, being that which occurs on upward movement of the valve from its lower extremity of movement. This blocking is timed to occur on the compression stroke of the engine. The other blocking does however serve a subsidiary function as also described later.

Chamber 40 is provided with a fuel injector 70 and a spark plug 72. Chamber 36 is provided only with a fuel injector 74. As best appreciated from FIG. 2, the chambers 36, 40 are defined within internal walls 16b of the cylinder head 16, such that coolant fluid in cavity 48 can freely circulate therearound.

Operation of the engine is now broadly described. The engine, as mentioned, operates on a four-stroke cycle and in the usual fashion except that air only is inducted into the engine during the induction phase. This occurs with valve 18 open and with piston 14 descending in cylinder 12. Upon subsequent upward movement of the piston, the air is compressed, valves 18, 20 are all closed and valve 42 is open as the piston moves from bottom dead centre. Injector 70 is also operated to inject fuel into chamber 40 just prior to or during the early stage of compression. Thus, fuel air mixture is compressed in chamber 40. Fuel injected into chamber 40 does not pass, to any great extent, into chamber 36 but air compression does so occur therein. At a time before top dead centre is reached, and at a time when the compression prevailing is suitable for spark ignition, valve 42 is closed by action of cam shaft 24 through rocker arm 62 to cause upward movement thereof so that the lower portion 42a blocks ports 38a and 38b. Then, compression does not further continue in chamber 40 but continues in chamber 36 until the piston 14 reaches top dead centre. At this stage, there is, as mentioned, still a small clearance volume between the cylinder and the piston but most of the air in the cylinder is transferred into chamber 36. At around top dead centre, additional fuel is injected from injector 74 into chamber 36. The captive air-fuel mixture in chamber 40 is ignited by spark plug 72 whereupon valve 42 opens by virtue of upward movement of portion 42a to clear openings 38a, 38b. The expanding combustion products from chamber 40 pass along passageway 38 into chamber 36 where the air-fuel mixture therein is combusted by the burning mixture from chamber 40. Combustion in chamber 36 causes downward movement of the piston 14 in cylinder 12, the engine then proceeding on its expansion stroke to bottom dead centre and thence valve 20 is opened on the following exhaust stroke as the piston moves upwardly in the cylinder.

It will be appreciated from the above that the effect of the valve 42 is to isolate the chamber 40 for a brief period towards the end of the compression stroke so that the air-fuel mixture in chamber 40, when it is ignited, is at a lower compression ratio than the air in chamber 36 which is compressed over the whole of the compression stroke.

The timing of injection into chamber 36 may be such that injection starts substantially coincidentally with opening of the valve (low speed operation) and continues after opening, or for high speed operation can begin just prior to opening.

As the products of combustion emitted from the chamber 40 passing through the valve 42 may be rich in fuel there will be partially burnt carbon particles present in the transferring gas, and this carbon may reduce the friction in the valve. However, provision is made to ensure that these fine particles do not accumulate in the lower section of the valve sleeve. To avoid this the spacer 56 is provided with a small orifice 56a; the lower section of the space communicates with the chamber 40 via a passage (not visible in the drawings) in head 16. In operation, when the bottom valve portion 42a passes below the openings 38a, 38b a volume of gas is trapped within the spacer 56, and as the valve 42 continues downwardly, this gas is compressed through the spacer orifice, and into the chamber 40. Then, the chamber 40 is again placed in communication with the chamber 36, as the valve portion 42a passes lower than the openings. At this stage the engine is just completing induction so there is no pressure to oppose such action. Because the interior of the spacer 56 is connected to the chamber 40 it is ensured that when the charge in chamber 40 is ignited and its pressure raised, pressure in the interior of the spacer and below the valve head is also raised. Upon subsequent opening of the valve 42 any particles of carbon are blown out of the lower portion of the sleeve 46 with the transfer volume. The constant directional change in the gas flow through the spacer orifice ensures that it remains unblocked by carbon build up.

The fuel injector 70 may be timed, metered and directed to spray fuel into the passage 38, this injection taking place at a time when the air flow into the pilot chamber is not strong, or even earlier, prior to the start of compression. This enables the fuel which is injected under high pressure to travel the additional distance into the passage 38. Much of the injected fuel will be finely divided and vaporised almost immediately, so losing weight and velocity quickly, and consequently will be carried by the incoming air back into the pilot chamber. The remaining droplets travelling against the heated incoming air stream will by such action be subjected to quite a high relative velocity, further improving vaporizing characteristics. The largest droplets will however, impinge upon the walls of the transfer passage 38 and the lower face of the valve 42 to thereupon vaporize.

This method of fuel injection for the pilot chamber is beneficial for a number of reasons:

(a) The remaining liquid fuel will be dispersed over an area which the incoming air must also pass through so ensuring even distribution in the air fuel charge.

(b) This action ensures that when the engine is started from cold, and the only heat for vaporization is from compression heat alone, its confinement to the passage 38 will gain the most benefit. Also, if some liquid fuel should remain adhered to the passage walls, of passage 38, when they are cold, the subsequent combustion and release of the pilot charge in chamber 40 will ensure that it is swept out into the main chamber 36 and burnt.

(c) Such action ensures that the spark plug 72 which, as shown, is located out of alignment with the passage 38 is not subjected to conditions which may lead it to being subjected to unvaporized fuel and cold starting difficulties caused by the plug's insulation being lost by wet fouling.

(d) Under normal operating conditions the rapid evaporization of the fuel is assured as the combustion products of the chamber 40, while being of small volume, will be expelled at high temperature and velocity through this transfer passage. These walls so exposed will take on a percentage of the heat transferred, perhaps as much as 10%, (thus the passage is arranged to ensure adequate cooling). This heat thus retained from the previous cycle can be used to ensure rapid evaporization of the fuel, and since it is injected upon and within this section the full heat absorption as the fuel vaporizes will aid in absorbing this heat that would otherwise flow direct to the cooling medium for the passageway.

The chamber 40 operates generally upon a rich mixture. However under wide speed and load conditions, it can be advantageous to arrange variation of the fuel injection volume over the entire spark ignition air fuel range, and it has all of the compression phase to vaporize and so form an homogenous air fuel mixture. By arranging a mixture rich in fuel, it can be ignited easily by spark plug means even when the engine is cold. Also it has been proven that a rich mixture burns with a lower flame temperature, so reducing the tendency to produce oxides of nitrogen. A further advantage with this arrangement is that some exhaust products are bound to be recycled. Their presence is also beneficial in reducing the combustion temperature and $No_x$ formation; additional exhaust gas recycling equipment forms part of the low pollution devices currently used in automobiles to reduce this difficult form of emission. The compression level at which valve 42 closes is chosen to achieve ideal combustion, free from detonation or uncontrolled pressure rise, using a standard grade of moderate octane petrol free from additives of tetraethyle lead.

By using the described moderate compression ratio in the chamber 40, the problems generally associated with modern high compression engines can be minimised. At moderate compression levels the spark ignition methods are not subjected to factors promoting uncontrolled burning, so its behaviour is predictable and easily controlled, especially if the main factors remain near constant, as in the pilot chamber in which compression, air and fuel volumes remain comparatively fixed, regardless of engine load. The volume of fuel and air involved in the pilot combustion is selected on the basis of the fuel needing to be burnt to maintain engine idling speed, and ensure sufficient heat generation for the main combustion chamber's function. It will be apparent that this volume will be quite small—between 20% to 10% of the total cycle charge.

By using valve 42 to terminate the pilot chamber compression at the ideal level to suit the fuel's detonation characteristics, not only is the use of a much higher ratio in the main chamber facilitated, but with later closing time, a higher pilot chamber compression can be used to so assist in the effective spark ignition of lower grade fuels, such as the broad-cut fuels predicted for the future, which optimise refinery efficiencies for shale oils, or coal conversion.

The release valve's sudden closing and isolation of the pilot charge when it has attained only a moderate compression ratio, enables the pilot charge to proceed through an ideal spark ignited constant volume combustion pressure rise, while the engine's displacement means being free from fuel, can continue with its compression to a level far higher than that possible using 100 octane petrol; its compression level being determined solely by consideration of obtaining an efficient expansion ratio without taking the cycle pressure too high, and in comparison to the automotive diesel, maintaining the working gases density at a comparatively low level to further reduce direct heat loss to the engine components.

The combustion in chamber 40 is conducted such that controlled air flow is achieved to ensure reliable spark ignition in use. The chamber, being of small and geometrical dimensions, will have a very short flame path and, in comparison with normal combustion chambers, the delay involved from ignition to maximum pressure will therefore be correspondingly short. In combustion of the pilot volume it is not necessary to allow maximum pressure rise in the chamber 40. Ideally it should be released into the chamber 36 at a stage when the combustion is firmly established and the pressure has reached about half pressure rise. This is also considered in normal Otto cycle function to be the ideal pressure reached as the engine's piston passes through top dead centre.

As the variables are minimal, the release of the pilot charge at a suitable point can as described be simply arranged by spark timing. The ignition delay is therefore predictable and consistent, while the release valve's opening can be arranged to occur consistently at the ideal time in the cycle. With suitable spark timing the pilot volume can be released to expand into the lower pressure of the main chamber; this pressure imbalance ensures that the burning products of the pilot chamber enter the main combustion chamber with sufficient velocity and incandescence to promote complete burning characteristics in this chamber. Also, as combustion is still in progress when this imbalance takes place, there is ensured a strong flame reaction as the partly burnt products are transferred. A large portion of the pilot volume's fuel will therefore not release its energy until it enters the main chamber; this action being beneficial as the use of such heat and flame functions has been proven to be very effective in ensuring complete combustion and therefore low emissions. Also the pilot chamber and transfer passage are not subjected to as high a thermal loading, so reducing the direct heat loss in this area.

The mechanical isolation of the two chambers 36, 40 during part of the cycle enables considerable flexibility over the main combustion process. For instance, in normal diesel or Otto cycle function, ignition must be provided well before the piston has reached top dead centre; the combustion pressure produced before T.D.C. being substantial and further adding to the engine losses. However, with the described method of operation the delay period and initial pressure rise is conducted independently from the displacement components and the normal consideration involving crank angle functions. For example, this arrangement could be such that the very efficient compression ratio of 12:1 is selected to be the point at which the heat energy of the total fuel charge should be released. By suitable proportionment of combustion chamber volume, it is possible to take compression after the isolation of the pilot volume to a much higher level, over compressing it to say 16:1 at T.D.C. and allowing spring back on the normal expansion stroke to a level of 12:1. At this point the established combustion from the chamber 40 may be introduced along with additional fuel from the main injector 74. As ignition delay is no longer involved, the combustion pressure will be under the direct control of the fuel injection delivery rate.

The described method of operation does lose some potential expansion ratio, but is chosen as a compromise. Obviously, if desired the expansion could commence at 16:1, but such action would be detrimental to the aim of maintaining a light, cheaply manufactured engine while denying further advantages in other areas. One of the main objectives in using this over compression method is to largely avoid the normal high pressure and temperature combustion reaction in a chamber that can not readily expand because of the bearing alignment involved with a crank action. Using this method the crank is able to pass through its rocking action and gain a worthwhile lever arm, and the chamber's volume is increasing about four times faster than normal. It must be realised that with normal cycles it would be completely unsatisfactory and inefficient to try and initiate combustion at this stage. However, by the invention it is possible to obtain extremely fast combustion reaction and so release the heat energy of the fuel efficiently, regardless of this expansion.

In normal practice, if the heating value of the fuel is released quickly, the highest cycle temperature and pressure is achieved. This action, while thermally efficient, is difficult in practice to harness mechanically. By providing a chamber that will increase in volume rapidly in relation to time, a fast release can be obtained without incurring the high pressure rise common to constant volume combustion. As the objective of any heat engine is to convert as large a portion of the fuel's heat energy into usable work, there is little point to impose unnecessary mechanical restrictions upon expansion, as this will only increase the heat loss and thermal load upon the engine's components.

The described engine ensures rapid expansion which is beneficial in reducing the formation of oxides of nitrogen. Nitrogen is normally inert in combustion, and its generation is a product of modern engine design. It is only produced be engines of high compression possessing relatively compact and thermally efficient combustion chambers working under load. Some of the nitrogen present in the charge can be reduced to oxides if the temperature and pressure are maintained high enough for a period of time and reducing the time period for formation is very beneficial. Also, the burning of a mixture just slightly leaner than chemically correct will produce the maximum while the compression pressure and, therefore the density of the gas if high, will ensure the intimate contact needed for oxidation. In consideration of these factors influencing the formation of $NO_x$ with this method, using rapid release of heat in an over abundance of air at moderate pressure and density, followed by a rapid heat reduction by expansion, it provides very worthwhile solution to avoid the formation of this normally difficult to control emission, while the complete burning characteristics under excess oxygen conditions in the main combustion chamber ensure that the fuel is completely reduced to harmless water vapour and carbon dioxide. A major reason for using the swirl chamber 36 instead of a normal combustion chamber formed by a depression in the head and/or the crown of the piston, is to reduce emissions. Future legislation aimed to reduce emissions is so strict that it is therefore difficult to see how it can be complied with in a conventional chamber formed by the displacement components, which for practical mechanical reasons cannot be formed without clearance between the moving and stationery components, while the valves and spark plug positioning also require consideration. Due to these factors, the combustion chamber can not be designed without incurring restricted areas into which the fuel and air charge may be forced and so not completely consumed during combustion, and thus to ultimately appear in the exhaust products. The swirl chamber 36 avoids these problems by burning any fuel prior to it reaching piston clearance areas. By the use of such methods excellent air utilization can be gained. However, to maintain low emissions, one cannot afford to burn all the air volume and must arrange that under full load some air must pass through the engine unburnt. It is for this reason that it is important to provide an engine design capable of high speed operation so that its power and bulk are not substantially changed. This applies particularly to a reciprocating engine approach.

While these methods are not sensitive to petrol octane rating, and a wide range of gaseous and liquid fuels could be used, petrol will be for many years the main fuel used for automotive transport, and in its regular form ideal for split phase methods. Petrol is very volatile and turns to vapour even at standard temperature; this volatility is advantageous for combustion as no liquid fuel will burn until it is vaporized. However volatility should not be confused with ignitability or the heat required to create spontaneous ignition. Light fractions of dieseline as used in automotive engines possess good ignitability and are expressed as a high figure in cetane rating. Heavy diesel oils used in large diesels have a correspondingly lower cetane rating. Petrol while highly volatile has an even lower cetane value, and it takes special effort and provisions to burn it in a diesel engine.

It has been demonstrated that large diesel engines can operate on a compression ratio as low as 12:1, and such engines return the best specific fuel consumption obtainable with diesel practice. The use of smaller pistons, suitable for high speed automotive use, must use far higher ratios of compression to offset the loss of compression heat due to the increased surface to volume ratio, and the swirl chamber used to obtain high speed operation. These factors indicate that as the described method also makes use of a swirl chamber (chamber 36), the heat of compression will be likewise reduced. Furthermore, the main chamber 36 can be adequately water jacketed and so cooled, while its construction is not hampered by the usual pre-ignition instigators, that is the spark plug electrodes and the hot exhaust valve. Conditions are such that during high speed low load conditions, fuel injection could be advanced to inject and mix thoroughly with the compressed air in the main chamber just prior to the release of the incandescent pilot charge. This pre-introduction of fuel to the chamber 36 under light load high speed operation will ensure a rapid burn as this fuel and air charge is pre-conditioned, or in other words the fuel and air particles are evenly dispersed and completely vaporized so that the incandescent pilot charge when released, gains further heat as it passes through this homogenous mixture. This form of combustion will obviously be very rapid, but not subjected to opposing shock waves; the pressure differentials that can be used ensure transfer at high velocity, so during the difficult function of obtaining high speed combustion in a very weak mixture this aspect is of considerable importance.

Apart from the low cetane rating of petrol, it is only possible to inject a portion of the total fuel early if moderate peak combustion pressures are to be maintained. At the compression temperatures contemplated, the fuel is hardly likely to ignite upon injection, and some delay period will be involved due to the high air turbulence of the chamber, and its volatility; it will be rapidly formed into a mixture too rich in air and so taken out of the inflamable mixture range. This aspect is a further reason why it is so difficult to operate a diesel engine on petrol.

Through the complete load and speed range used in automotive application the method of this invention is ideal. Under idle or deceleration, fuel injection into the chamber 36 can be avoided and the expansive force of the pilot charge completely consumed in an over abundance of air and taken through a large expansion. A comparison with the Otto cycle under these conditions is illustrative; it must burn an over rich mixture under low compression, its efficiency is very low and its expulsion of unburnt and partially burnt fuel is in proportion, very high. On the other hand, a similar diesel using a high compression and an air fuel ratio close to 100 to 1 can idle so efficiently that its fuel comsumption is only 15% that of the petrol engine.

The method of the invention enables under low speed but high load conditions similar lugging power, or low speed torque, as obtained by a diesel engine. This is due to the ability to control the combustion by using direct injection methods in conjunction with a speed responsive governor. It is simple to retard fuel injection at low engine speed and then progressively advance it as engine speed rises. By this method it is possible to release the fuel energy in a more controlled manner, so reducing the pressure rise and gaining a more constant pressure expansion, thus enabling smooth high torque in the low speed range. The use of such a method under low speed conditions, may be less thermally efficient. However, in the light of the flexibility gained and the aspects involved in normal automotive engine use, it may nevertheless be advantageous.

The described arrangement ensures that the main combustion and the highest heat phase of the cycle take place in a chamber (chamber 36) with ideal provisions and minimal surface area; these aspects being desirable to reduce pollutant producing quench areas and direct heat loss. Whilst these factors are important, a cheaper engine could be built by the normal method of forming the main chamber as a suitably shaped depression in the cylinder head or piston crown, then arranging the transfer passage 38 controlled by the release valve 42 to associate directly with the so formed main combustion chamber and removing the necessary of the swirl chamber 36.

Also, if the described chambers and methods are used with engines utilizing different displacement components, such as an orbiting piston or a rotating piston, the location and arrangement of the various components may, for practical reasons of changed basic engine shape, be arranged in disposition to each other slightly differently; for instance, the main communication passage 34 may be located at a different angle from the chamber 36.

The described engine is a 4-stroke engine but the principles of the invention can be applied to either a 4-stroke or 2-stroke method of operation and, as explained, with any form of positive displacement engine.

The chambers 36 and 42 are formed between the face of the cylinder head and a suitable insert 29 which is held in place by the crush of the cylinder head joint. This insert which is manufactured from nimonic steel or a suitable high nickel alloy, having a high oxidation resistance, is used to reduce the direct heat loss involved with such a chamber by maintaining a high surface temperature, this being particularly important to reduce the heat flow as the combustion products are expelled through the main passage 34. The chamber 36 is formed with the passage 34 and passageway 38 situated at opposite ends of the cylindrical chamber, to ensure that the combustion products expelled from the chamber 40 through the passageway 38 must travel at least once around the diameter of the main chamber and so ensure sound mixing and burning of the main chamber contents.

With the chamber 36 formed as such a swirl chamber the advantage is gained that the bulk of the combustion takes place in a compact, well formed area, with predictable turbulence in relation to engine speed, while the restricted quench areas which are difficult to avoid in a normal chamber that has been formed partly by the displacement component are avoided. The maximum flame temperature and radiation is confined to a relatively small wall surface area; with the largest portion possessing heat retaining liner characteristics, and therefore high residual temperature, wall quenching and the consequent formation of unburnt hydrocarbons is substantially reduced. It also affords maximum ease in relation to the requirements demanded from the fuel injection equipment, fuel spray directional qualities, spray penetration and droplet size, these factors not being of critical importance when the high air speeds of such a chamber compensates.

The compact nature of the main chamber and the higher compression ratios which can be used with the described split phase method, makes the complete combustion of lean mixtures practical to a very low level of fuel content, as normal flame propagation is replaced by an ideal form of mass flame transfer when the pilot chamber products are released. When further fuel is introduced to this chamber via the main fuel injector, the injection timing can be such that a portion of the delivery is introduced just prior to the release valve opening. This portion will therefore have time to disperse and mix with the turbulent air. When the pilot flame enters the chamber, this fuel is consumed at the rate of flame travel. By suitable spark timing, the flame speed can be adjusted to provide a desirable combustion rate, while the remaining injection delivery into the well established combustion can be used to control the pressure rise.

When using a swirl chamber such as chamber 36 it is important that the cylinder head and piston be flat and that the piston to head clearance be maintained at a minimum, so as to ensure that the maximum air volume, at T.D.C., can be used for combustion in the main chamber. However the small portion of air left in the displacement chamber still plays an important part under high load conditions by reforming partially burnt products which are ejected into it.

I claim:

1. A divided chamber, split phase engine comprising:
a cylinder having a closed end, inlet and exhaust valves, and a first passageway opening formed in the closed end, said inlet valve controlling fluid flow into the interior of said cylinder, and said outlet valve controlling fluid flow from said cylinder;
a piston cyclically reciprocable in said cylinder to cause cyclic variation in the volume defined in the cylinder between said piston and said closed end, so as to effect, during a cycle of operation, at least an induction stroke when the piston moves away from the closed end, and a compression stroke when the piston moves towards the closed end;
a main combustion chamber formed in a portion of said closed end of said cylinder spaced from the defined volume;
a first passageway formed in said closed end and interconnecting said main combustion chamber with said first passageway opening;
a substantially closed subsidiary combustion chamber smaller than said main combustion chamber formed in a portion of said closed end of said cylinder spaced from the defined volume and said main combustion chamber;
a second passageway formed in said closed end and having ends in permanent fluid communication with said main and said subsidiary chambers for interconnecting said main and said subsidiary combustion chambers;
control valve means positioned intermediate ends of said second passageway for controlling fluid flow through said second passageway;
means for admitting fuel into said main and said subsidiary combustion chambers;
means for igniting a first fuel-air mixture in said subsidiary combustion chamber; and
control means for controlling said control valve means, said control means placing said control valve means in a first open position permitting fluid flow from the defined volume into said subsidiary combustion chamber via said passageways and said main combustion chamber, said control valve means being in the first open position during an initial portion of the compression stroke so that pressure of fluid in both said main subsidiary combustion chambers increases, said control means placing said control valve means in a position blocking fluid flow through said second passageway during a subsequent portion of the compression stroke, said means for admitting fuel being operative to admit fuel into said subsidiary combustion chamber to form the first fuel-air mixture and being operative to admit fuel into said main combustion chamber to form a second fuel-air mixture, said control means placing said control valve means in a second open position after ignition of the first fuel-air mixture so that the ignited first fuel-air mixture passes through the second passageway and ignites the second fuel-air mixture, the ignited second fuel-air mixture passing through said first passageway into said cylinder volume and expanding therein.

2. An internal combustion engine as claimed in claim 1, wherein said means for admitting fuel includes first and second injector means for injecting fuel respectively into said main and subsidiary combustion chambers, and wherein said second injector means is operable to inject said fuel into said subsidiary combustion chamber for a time period which begins before the end of said initial part of said compression stroke whereby to cause at least part of such injected fuel to travel from said subsidiary combustion chamber via said second passageway to said main combustion chamber so that, in addition to forming said first air-fuel mixture, said second injector means also provides part of the fuel component of said second air-fuel mixture.

3. An internal combustion engine as claimed in claim 2, wherein closing of said control valve means is coordinated with said injecting of fuel from said second injector means whereby the amount of fuel in said main combustion chamber at said closing of said control valve means provides a leaner air-fuel mixture, at such closing, than the air-fuel mixture then prevailing in said subsidiary combustion chamber.

4. An internal combustion engine as claimed in claim 2, wherein said first and second injector means operate to provide an air-fuel ratio of said first air-fuel mixture which at said igniting of said first air-fuel mixture is richer than the air-fuel ratio of said second air-fuel mixture.

5. An internal combustion engine as claimed in claim 2, claim 3, or claim 4, wherein said first injector means injects fuel into said main combustion chamber substantially at the end of said compression stroke.

6. An internal combustion engine as claimed in claim 5, wherein said second injector means is timed to cease injecting fuel into said subsidiary combustion chamber before said second opening of said control valve means.

7. An internal combustion engine as claimed in claim 1, wherein said piston has a stroke such as to cause the piston to clear said closed end, at the closest point in its stroke, by a small clearance distance.

8. An internal combustion engine as claimed in claim 2, wherein ignition of said air-fuel mixture in said main combustion chamber is arranged to occur after a top dead center position of said piston occurring at the end of said compression stroke.

9. An internal combustion engine as claimed in claim 2, including means for regulating said injection of fuel so that injection occurs later in a cycle of operation of an engine running at low speed than with an engine running at high speed.

10. An internal combustion engine as claimed in claim 1, wherein said piston is flat topped.

11. An internal combustion engine according to claim 2, wherein said second injector means is operative to inject fuel into said subsidiary combustion chamber for an interval beginning prior to the beginning of said compression stroke.

12. An internal combustion engine comprising:
a cylinder having a closed end and inlet and exhaust valves, said inlet valve controlling fluid flow to the interior of said cylinder and said outlet valve controlling fluid flow from the cylinder;
a piston cyclically reciprocable in said cylinder to cause cyclic variation of the volume defined in the cylinder between said piston and said closed end, so as to effect, on each cycle of operation, at least an induction stroke under a condition when the piston moves away from the closed end, and a compression stroke under a condition when the piston moves towards the closed end;
a main combustion chamber at said closed end of said cylinder and in continuous fluid flow communication with said volume via a first passageway,
a substantially closed subsidiary combustion chamber smaller than said main combustion chamber and connected to said main combustion chamber via a second passageway,
control valve means in said second passageway cyclically controlling fluid flow communication between said main and subsidiary combustion chambers via said second passageway;
first and second injector means for injecting fuel respectively into said main and subsidiary combustion chambers;
ignition means associated with said subsidiary combustion chamber;
said inlet valve operating to communicate said cylinder volume with air during said induction stroke to induct air into said cylinder volume;
said control valve means being arranged to be in a first open condition to communicate said main and subsidiary combustion chambers with each other via said second passageway during a first part of said compression stroke first occurring after said induction stroke, and said piston during said first part of said compression stroke compressing air in said volume as well as air in said combustion chambers which has passed into said combustion chambers from said volume via said passageways, said first air-fuel mixture in said subsidiary combustion chamber being compressed to a maximum compression ratio in the range 6:1 to 8:1;
said second injector means operating to inject fuel into said subsidiary combustion chamber at least prior to termination of said compression stroke to form a first air-fuel mixture in said subsidiary combustion chamber;
said control valve means closing said communication between said combustion chambers during a second part of said compression stroke next occurring after said first part whereby said first air-fuel mixture in said subsidiary combustion chamber is at a lesser compression ratio than said air in said main combustion chamber at the end of said compression stroke;
said ignition means igniting said first air-fuel mixture after said closing of said control valve means and after beginning of said second part of said compression stroke;
and said control valve means being in a second open condition to provide communication between said combustion chambers after said igniting and after pressure buildup in said subsidiary combustion chamber due to said igniting but while said first air-fuel mixture is still burning;
said first injector means injecting fuel to mix with the air which has been compressed in said main combustion chamber, said injecting occurring at least after beginning of said second compression stroke part and before the opening of said control valve means to provide said communication between said main and subsidiary combustion chambers so that there is, before such opening, formed in said main combustion chamber a second air-fuel mixture leaner than said first air-fuel mixture, at least part of the fuel component of which has been provided by the fuel from said first injector means, said pistion during said second part of said compression stroke compressing said second air-fuel mixture in said main combustion chamber to a compression ratio substantially in the range 12:1 to 15:1, said second air-fuel mixture then undergoing ignition in said main combustion chamber by virtue of being brought into contact with said burning first air-fuel mixture which is energetically expelled from said subsidiary combustion chamber via said second passageway pursuant to the said control valve means being in the second open condition, the ignited second air-fuel mixture in said main combustion chamber thence passing via said first passageway to said volume whereby it undergoes expansion therein during a subsequent movement of said piston away from said closed end of said cylinder after said compression stroke;

said exhaust valve opening to exhaust burnt said air-fuel mixture from said volume after said ignition of said second air-fuel mixture in said main combustion chamber.

13. An internal combustion engine comprising:

a cylinder having a closed end and inlet and exhaust valves, said inlet valve controlling fluid flow to the interior of said cylinder and said outlet valve controlling fluid flow from the cylinder;

a piston cyclically reciprocable in said cylinder to cause cyclic variation of the volume defined in the cylinder between said piston and said closed end, so as to effect, on each cycle of operation, at least an induction stroke under a condition when the piston moves away from the closed end, and a compression stroke under a condition when the piston moves towards the closed end;

a main combustion chamber at said closed end of said cylinder and in continuous fluid flow communication with said volume via a first passageway;

a substantially closed subsidiary combustion chamber smaller than said main combustion chamber and connected to said main combustion chamber via a second passageway;

control valve means in said second passageway cyclically controlling fluid flow communication between said main and subsidiary combustion chambers via said second passageway, said control valve means comprising a reciprocable valve element mounted for reciprocating blocking and unblocking linear movement transverse to said second passageway, so that when the valve means is closed fluid flow past the valve element is blocked by impingement of fluid against a side face of the valve element and, when the valve means is open, fluid flow is permitted by flow which is substantially confined to a direction normal to the direction of said blocking and unblocking linear movement;

first and second injector means for injecting fuel respectively into said main and subsidiary combustion chambers;

ignition means associated with said subsidiary combustion chamber;

said inlet valve operating to communicate said cylinder volume with air during said induction stroke to induct air into said cylinder volume;

said control valve means being arranged to be in a first open condition to communicate said main and subsidiary combustion chambers with each other via said second passageway during a first part of said compression stroke first occurring after said induction stroke, and said piston during said first part of said compression stroke compressing air in said volume as well as air in said combustion chambers which has passed into said combustion chambers from said volume via said passageways;

said second injector means operating to inject fuel into said subsidiary combustion chamber at least prior to termination of said compression stroke to form a first air-fuel mixture in said subsidiary combustion chamber;

said control valve means closing said communication between said combustion chambers during a second part of said compression stroke next occurring after said first part whereby said first air-fuel mixture in said subsidiary combustion chamber is at a lesser compression ratio than said air in said main combustion chamber at the end of said compression stroke;

said ignition means igniting said first air-fuel mixture after said closing of said control valve means and after beginning of said second part of said compression stroke;

and said control valve means being in a second open condition to provide communication between said combustion chambers after said igniting and after pressure buildup in said subsidiary combustion chamber due to said igniting but while said first air-fuel mixture is still burning;

said first injector means injecting fuel to mix with the air which has been compressed in said main combustion chamber, said injecting occurring at least after beginning of said second compression stroke part and before the opening of said control valve means to provide said communication between said main and subsidiary combustion chambers so that there is, before such opening, formed in said main combustion chamber a second air-fuel mixture, at least part of the fuel component of which has been provided by the fuel from said first injector means, said second air-fuel mixture then undergoing ignition in said main combustion chamber by virtue of being brought into contact with said burning first air-fuel mixture which is energetically expelled from said subsidiary combustion chamber via said second passageway pursuant to the said control valve means being in the second open condition, the ignited second air-fuel mixture in said main combustion chamber thence passing via said first passageway to said volume whereby it undergoes expansion during a subsequent movement of said piston away from said closed end of said cylinder after said compression stroke;

said exhaust valve opening to exhaust burnt said air-fuel mixtures from said volume after said ignition of said second air-fuel mixture in said main combustion chamber.

14. An internal combustion engine comprising:

a cylinder having a closed end and inlet and exhaust valves, said inlet valve controlling fluid flow to the interior of said cylinder and said outlet valve controlling fluid flow from the cylinder;

a piston cyclically reciprocable in said cylinder to cause cyclic variation of the volume defined in the cylinder between said piston and said closed end, so as to effect, on each cycle of operation, at least an induction stroke under a condition when the piston moves away from the closed end, and a compression stroke under a condition when the piston moves towards the closed end;

a main combustion chamber at said closed end of said cylinder and in continuous fluid flow communication with said volume via a first passageway, said main combustion chamber being generally cylindrical in form with its axis perpendicular to the axis of said cylinder;

a substantially closed subsidiary combustion chamber smaller than said main combustion chamber and connected to said main combustion chamber via a second passageway, said subsidiary combustion chamber being generally cylindrical in form with its axis perpendicular to the axis of said cylinder, said combustion chambers being formed as swirl chambers to induce a swirling action into the motion of ignited air-fuel mixtures therein;

control valve means in said second passageway cyclically controlling fluid flow communication between said main and subsidiary combustion chambers via said second passageway;

first and second injector means for injecting fuel respectively into said main and subsidiary combustion chambers;

ignition means associated with said subsidiary combustion chamber;

said inlet valve operating to communicate said cylinder volume with air during said induction stroke to induct air into said cylinder volume;

said control valve means being arranged to be in a first open condition to communicate said main and subsidiary combustion chambers with each other via said second passageway during a first part of said compression stroke first occurring after said induction stroke, and said piston during said first part of said compression stroke compressing air in said volume as well as air in said combustion chambers which has passed into said combustion chambers from said volume via said passageways;

said second injector means operating to inject fuel into said subsidiary combustion chamber at least prior to termination of said compression stroke to form a first air-fuel mixture in said subsidiary combustion chamber;

said control valve means closing said communication between said combustion chambers during a second part of said compression stroke next occurring after said first part whereby said first air-fuel mixture in said subsidiary combustion chamber is at a lesser compression ratio than said air in said main combustion chamber at the end of said compression stroke;

said ignition means igniting said first air-fuel mixture after said closing of said control valve means and after beginning of said second part of said compression stroke;

and said control valve means being in a second open condition to provide communication between said combustion chambers after said igniting and after pressure buildup in said subsidiary combustion chamber due to said igniting but while said first air-fuel mixture is still burning;

said first injector means injecting fuel to mix with the air which has been compressed in said main combustion chamber, said injecting occurring at least after beginning of said second compression stroke part and before the opening of said control valve means to provide said communication between said main and subsidiary combustion chambers so that there is, before such opening, formed in said main combustion chamber a second air-fuel mixture, at least part of the fuel component of which has been provided by the fuel from said first injector means, said second air-fuel mixture then undergoing ignition in said main combustion chamber by virtue of being brought into contact with said burning first air-fuel mixture which is energetically expelled from said subsidiary combustion chamber via said second passageway pursuant to the said control valve means being in the second open condition, the ignited second air-fuel mixture in said main combustion chamber thence passing via said first passageway to said volume whereby it undergoes expansion during a subsequent movement of said piston away from said closed end of said cylinder after said compression stroke;

said exhaust valve opening to exhaust burnt said air-fuel mixtures from said volume after said ignition of said second air-fuel mixture in said main combustion chamber.

* * * * *